(12) United States Patent
Rinker et al.

(10) Patent No.: US 11,045,897 B2
(45) Date of Patent: Jun. 29, 2021

(54) METHOD AND APPARATUS TO FORM A WORKPIECE EMPLOYING VIBRATION WELDING

(71) Applicant: GM Global Technology Operations LLC, Detroit, MI (US)

(72) Inventors: Teresa J. Rinker, Royal Oak, MI (US); Wayne W. Cai, Troy, MI (US); Michael P. Balogh, Novi, MI (US); Nicholas W. Pinto, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 126 days.

(21) Appl. No.: 16/582,112

(22) Filed: Sep. 25, 2019

(65) Prior Publication Data
US 2020/0016685 A1    Jan. 16, 2020

Related U.S. Application Data

(62) Division of application No. 15/159,876, filed on May 20, 2016, now abandoned.

(51) Int. Cl.
| | |
|---|---|
| *B23K 20/10* | (2006.01) |
| *B23K 20/00* | (2006.01) |
| *B23K 20/22* | (2006.01) |
| *B23K 20/227* | (2006.01) |
| *H01B 1/02* | (2006.01) |
| *B23K 103/18* | (2006.01) |
| *B23K 103/20* | (2006.01) |
| *B23K 103/22* | (2006.01) |

(52) U.S. Cl.
CPC .......... *B23K 20/10* (2013.01); *B23K 20/002* (2013.01); *B23K 20/004* (2013.01); *B23K 20/22* (2013.01); *B23K 20/227* (2013.01); *B23K 20/2275* (2013.01); *H01B 1/02* (2013.01); *B23K 2103/18* (2018.08); *B23K 2103/20* (2018.08); *B23K 2103/22* (2018.08)

(58) Field of Classification Search
CPC ........ B23K 11/12; B23K 1/06; B23K 20/227; B23K 20/2275; B23K 2103/22
See application file for complete search history.

(56) References Cited

U.S. PATENT DOCUMENTS

| | | | | |
|---|---|---|---|---|
| 3,459,355 A | * | 8/1969 | Metzger, Jr. ............ | H01L 24/78 228/1.1 |
| 3,717,842 A | * | 2/1973 | Douglas, Jr. ........... | H01R 4/187 29/860 |
| 3,790,059 A | * | 2/1974 | Jacke .................... | B29C 66/816 228/1.1 |
| 4,817,814 A | * | 4/1989 | Goto ...................... | B23K 20/10 228/1.1 |
| 5,299,726 A | * | 4/1994 | Sauer ...................... | B23K 1/06 228/111.5 |
| 5,857,259 A | * | 1/1999 | Johnston .............. | H01R 12/592 29/858 |
| 6,123,556 A | * | 9/2000 | Asakura ................... | H01R 9/05 29/828 |

(Continued)

*Primary Examiner* — Jason L Vaughan
(74) *Attorney, Agent, or Firm* — Quinn IP Law

(57) ABSTRACT

A workpiece is described, and includes a substrate, a cable, and a cover piece. A portion of the cable is joined to the substrate employing a vibration welding tool, and the cover piece is interposed between the portion of the cable and the vibration welding tool during the joining.

17 Claims, 3 Drawing Sheets

(56) References Cited

U.S. PATENT DOCUMENTS

| | | | | |
|---|---|---|---|---|
| 6,142,838 A * | 11/2000 | Shinchi | H01R 4/029 | 228/110.1 |
| 6,464,324 B1 * | 10/2002 | Le | B41J 2/1626 | 347/20 |
| 6,476,324 B1 * | 11/2002 | Ide | H01R 4/022 | 174/128.1 |
| 7,374,466 B2 * | 5/2008 | Onuma | H01R 11/28 | 439/874 |
| 7,784,878 B2 * | 8/2010 | Schlanger | B60B 1/041 | 301/104 |
| 8,283,592 B2 * | 10/2012 | Nakamae | B23K 26/009 | 219/117.1 |
| 8,609,988 B2 * | 12/2013 | Sagawa | H01R 4/029 | 174/84 R |
| 8,627,996 B2 * | 1/2014 | Patrikios | H01R 4/625 | 228/110.1 |
| 8,726,500 B2 * | 5/2014 | Hagi | H01R 43/28 | 29/863 |
| 8,931,685 B2 * | 1/2015 | Kataoka | H01R 4/021 | 228/110.1 |
| 9,011,188 B2 * | 4/2015 | Aoki | H01R 43/0207 | 439/874 |
| 9,812,835 B2 * | 11/2017 | Kern | H01R 43/0484 | |
| 9,855,623 B2 * | 1/2018 | Regenberg | H01R 4/187 | |
| 9,882,292 B2 * | 1/2018 | Koto | H01R 4/72 | |
| 10,396,472 B2 * | 8/2019 | Baldauf | H01R 4/625 | |
| 10,833,426 B2 * | 11/2020 | Hoenle | H01R 4/20 | |
| 10,879,631 B2 * | 12/2020 | Sato | H01R 4/023 | |
| 2002/0096352 A1 * | 7/2002 | Kuwayama | H01R 4/20 | 174/74 R |
| 2005/0087359 A1 * | 4/2005 | Tachibana | B23K 11/0033 | 174/94 R |
| 2006/0091994 A1 * | 5/2006 | Nelson | H01C 17/242 | 338/195 |

* cited by examiner

METHOD AND APPARATUS TO FORM A WORKPIECE EMPLOYING VIBRATION WELDING

CROSS-REFERENCE TO RELATED APPLICATIONS

This application is a divisional application of U.S. patent application Ser. No. 15/159,876 filed on May 20, 2016, the disclosure of which is hereby incorporated by reference.

TECHNICAL FIELD

The present disclosure relates to vibration welding systems, and workpieces that are joined employing vibration welding systems.

BACKGROUND

In a vibration welding process, adjacent surfaces of a clamped workpiece are joined together by the controlled application of vibration energy to the workpiece. Transmission of vibration energy creates surface friction and heat along interfacing surfaces of the workpiece. The heat softens the materials of the interfacing surfaces which ultimately bonds the surfaces together, thus forming a welded joint or weld spot.

Known vibration welding systems, e.g., ultrasonic welding systems include various interconnected welding tools. Primary among these tools are a vibrating sonotrode/welding horn and an anvil assembly. The anvil assembly may include an anvil body and a rigid back plate, the latter of which is bolted to a support member such as a frame, beam, or robot. The workpiece is clamped between the horn and the anvil body. The welding horn vibrates at a calibrated frequency in response to an input signal. The anvil body acts as a reaction surface to the vibrating horn.

Known methods and processes for joining cables fabricated from high-tensile strength materials to substrates, and joining cables formed from shape-memory alloys (SMAs) to substrates include crimping to form crimped joints, which may affect tensile strength, fatigue life and electrical resistance of the cables. Other known methods of joining, e.g., heat-based welding methods, may reduce the characteristic properties of the SMA cables.

SUMMARY

A workpiece is described, and includes a substrate, a cable, and a cover piece. A portion of the cable is joined to the substrate employing a vibration welding tool, and the cover piece is interposed between the portion of the cable and the vibration welding tool during the joining.

The above and other features and advantages of the present invention are readily apparent from the following detailed description of the best modes for carrying out the invention when taken in connection with the accompanying drawings.

DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
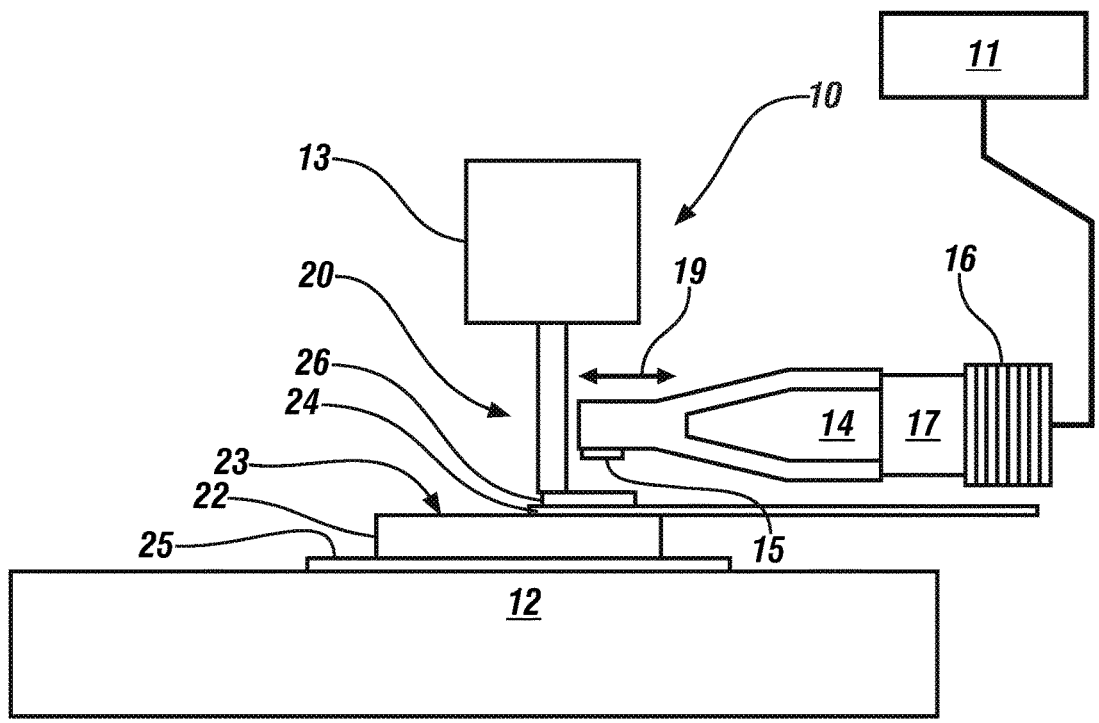
FIG. 1 is a schematic side-view illustration of an embodiment of a workpiece that includes a portion of a cable that is joined to a substrate with a cover piece positioned overtop, and an associated vibration welding system, in accordance with the disclosure.

Referring to the drawings, wherein like reference numerals refer to like components, FIG. 1 schematically shows a workpiece 20 including a portion of a cable 24 having a cover piece 26 overtop and joined to a substrate 22, and an associated vibration welding system 10. The cover piece 26 is advantageously interposed between the portion of the cable 24 and a welding pad 15 of a welding horn 14 of the vibration welding system 10. The portion of the cable 24 may be an end portion of the cable 24 in one embodiment. Alternatively, the portion of the cable 24 may be any suitable location along a length of the cable 24. The vibration welding system 10 may be employed to join the portion of the cable 24 and cover piece 26 to the substrate 22, as described herein.

In one embodiment, the cable 24 is a single strand of wire that is fabricated from a high tensile strength steel that also preferably has a high Young's modulus. Alternatively, the cable 24 is composed of multiple strands of wire that are fabricated from a high tensile strength steel. Alternatively, the cable 24 is a single strand of wire that is fabricated from a shape-memory alloy (SMA) material. Alternatively, the cable 24 is composed of multiple strands of the SMA wire. SMA materials are thermo-mechanical materials that convert energy between mechanical and thermal domains. SMA examples may include nitinol, copper-zinc-aluminum-nickel, copper-aluminum-nickel, iron-manganese-silicon, and nickel-titanium alloys. SMA material properties may also change in response to application of electromagnetic fields, and therefore may include an applied field. Material properties of SMA material may permanently change in response to exposure to elevated temperatures, including, e.g., temperatures that are achieved during known metal welding processes such as various forms of arc welding.

The substrate 22 may be any suitable device that is fabricated from a material to which the cable 24 is to be joined. The substrate 22 may have a plate shape, a cylindrical shape, or another suitable shape. The substrate 22 may be formed from aluminum, copper, steel, thermoplastic polymers or another suitable material. As shown with reference to FIG. 1, a welding surface 23 of the substrate 22 is planar.

The cover piece 26 may be in the form of a sheet of material in one embodiment and as shown. Alternatively, the cover piece 26 may be in the form of a thin, flexible foil element that is capable of being wrapped around cable elements multiple times, as is shown with reference to FIG. 7. The cover piece 26 may be fabricated from any suitable material and is preferably the same material as the substrate, e.g., aluminum, copper, steel, thermoplastic polymers or another suitable material. The cover piece 26 may be flat, corrugated, or have another suitable surface configuration. The cover piece 26 is interposed between the portion of the cable 24 and a welding pad 15 of a welding horn 14 of the vibration welding system 10. As such, selected design features of the cover piece 26, including, by way of example, its thickness, are selected to prevent or minimize mechanical damage to the portion of the cable 24 that may be induced by the movement of the welding pad 15 of the welding horn 14 during operation of the vibration welding system 10.

The vibration welding system 10 is configured for forming vibration-welded joints using vibrational energy, e.g., ultrasonic vibration energy. The vibration welding system 10 includes an actuator in the form of the welding horn 14, a movable head 13, and an anvil assembly 12 in one embodiment. The welding horn 14 may also be referred to as a vibrating sonotrode. The vibration welding system 10 preferably operates in an ultrasonic frequency range, although other vibration frequency ranges may be employed without departing from the intended scope of the concepts described herein.

The anvil assembly 12 provides a relatively static mass of metal sufficient for opposing the welding horn 14 during operation of the vibration welding system 10. The movable head 13 is disposed to apply compressive pressure to the workpiece 20 against the anvil body 12 as part of the welding process. The welding horn 14 may be incorporated into the movable head 13 in one embodiment, or alternatively, the welding horn 14 may have a separate structure from the movable head 13.

The welding horn 14 may include one or a plurality of welding pads 15 that are disposed to face the workpiece 20 that is to be welded. The welding pad 15 may have a knurled surface that includes raised bumps or ridges, or another suitable surface configuration. The surface of the welding pad 15 physically contacts the workpiece 20 during the vibration welding process. The anvil body 12 may likewise have similar anvil pads 25. The welding pad 15 and the anvil pad 25 serve to grip the workpiece 20 during the vibration welding process.

The welding horn 14 couples to a booster 17 and a piezoelectric stack 16, and a controller 11 is operatively connected to the piezoelectric stack 16. The piezoelectric stack 16 is a vibrational energy input device. The welding horn 14 may be caused to vibrate by activation of the piezoelectric stack 16 in response to a sinusoidal or another repetitive oscillating signal that is provided from the controller 11. As is understood in the art, piezoelectric materials are electromechanical materials that transform energy between mechanical and electric domains. Piezoelectric materials may be crystalline structures or ceramics that produce an output voltage signal in response to a mechanical stress. This effect also occurs in the reverse manner, i.e., a mechanical displacement or strain is induced in response to a fixed or oscillating voltage input that is applied to a sample piezoelectric material. For example, activation of a given piezoelectric material may result in a change in dimension of approximately 0.1% for piezo-ceramics and approximately 1% for piezo-polymers. As such, the piezoelectric stack 16 may vibrate in response to the repetitive oscillating signal provided from the controller 11, and the vibration may be propagated through the booster 17 to the welding pad 15 of the welding horn 14. The direction of the induced vibration is indicated by arrow 19.

In one advantageous embodiment, a method for joining the cable 24 to the substrate 22 can include positioning a portion of the cable 24 onto a surface of the substrate 22, including interposing the cover piece 26 overtop of the portion of the cable 24. The substrate 22, the portion of the cable 24 and the cover piece 26 may be placed onto the anvil 12 of the vibration welding system 10 such that the cover piece 26 is interposed between the cable 24 and the welding pad 15 that is attached to the welding horn 14 of the vibration welding system 10. A compressive force may be induced by the movable head 13 onto the substrate 22, the portion of the cable 24 and the cover piece 26 to place the aforementioned pieces in proximity to each other. The welding horn 14 of the vibration welding system 10 may be activated to apply ultrasonic vibration energy onto the cover piece 26 to mechanically join the substrate 22, the cable 24 and the cover piece 26 in a low-temperature environment.

Figure 2:
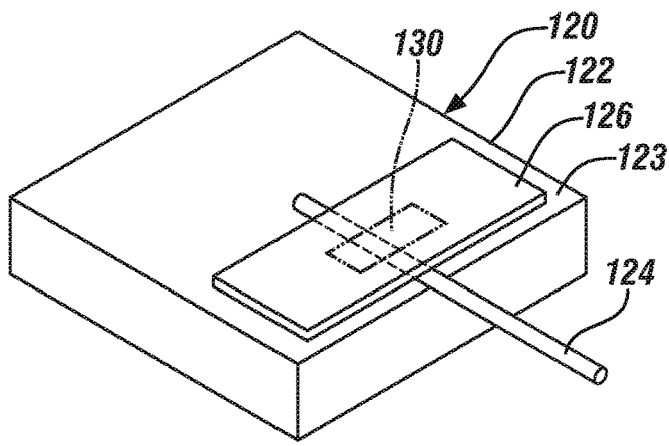
FIG. 2 is a schematic isometric illustration of an embodiment of a workpiece that includes a portion of the cable joined to the substrate in a lap arrangement with the cover piece positioned overtop, in accordance with the disclosure.

FIG. 2 is a schematic isometric illustration of an embodiment of a workpiece 120 that includes a portion of a cable 124 that is to be joined to a surface 123 of a substrate 122 employing an embodiment of the vibration welding system 10 described with reference to FIG. 1. The workpiece 120 includes the portion of the cable 124 joined to the substrate 122 in a lap arrangement with a cover piece 126 positioned overtop to interpose between the portion of the cable 124 and the welding horn 14 of the vibration welding system 10. An example location of the vibration welding is indicated by element 130.

Figure 3:
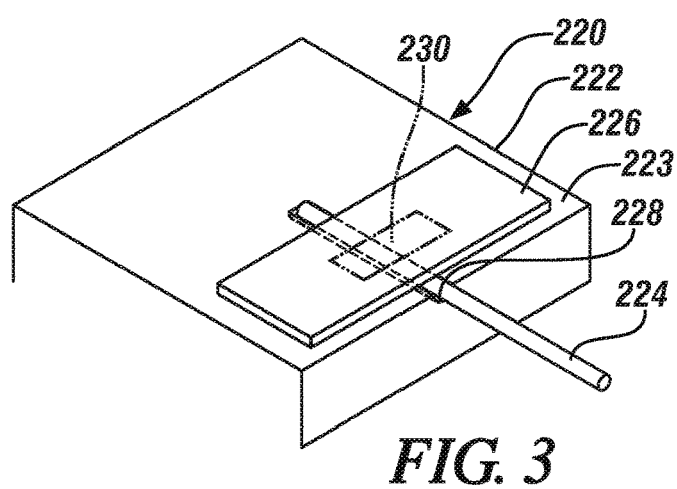
FIG. 3 is a schematic isometric illustration of an embodiment of a workpiece that includes a portion of the cable joined to the substrate in a lap arrangement with the cover piece positioned overtop, wherein the portion of the cable is disposed in a channel formed in the surface of the substrate, in accordance with the disclosure.

FIG. 3 is a schematic isometric illustration of another embodiment of a workpiece 220 that includes a portion of a cable 224 that is to be joined to a surface 223 of a substrate 222 employing an embodiment of the vibration welding system 10 described with reference to FIG. 1. The workpiece 220 includes the portion of the cable 224 joined to the substrate 222 in a lap arrangement with a cover piece 226 positioned overtop, wherein the portion of the cable 224 is disposed in a channel 228 formed in the surface of the substrate 222. The cover piece 226 is positioned to interpose between the portion of the cable 224 and the welding horn 14 of the vibration welding system 10. An example location of the vibration welding is indicated by element 230.

Figure 4:
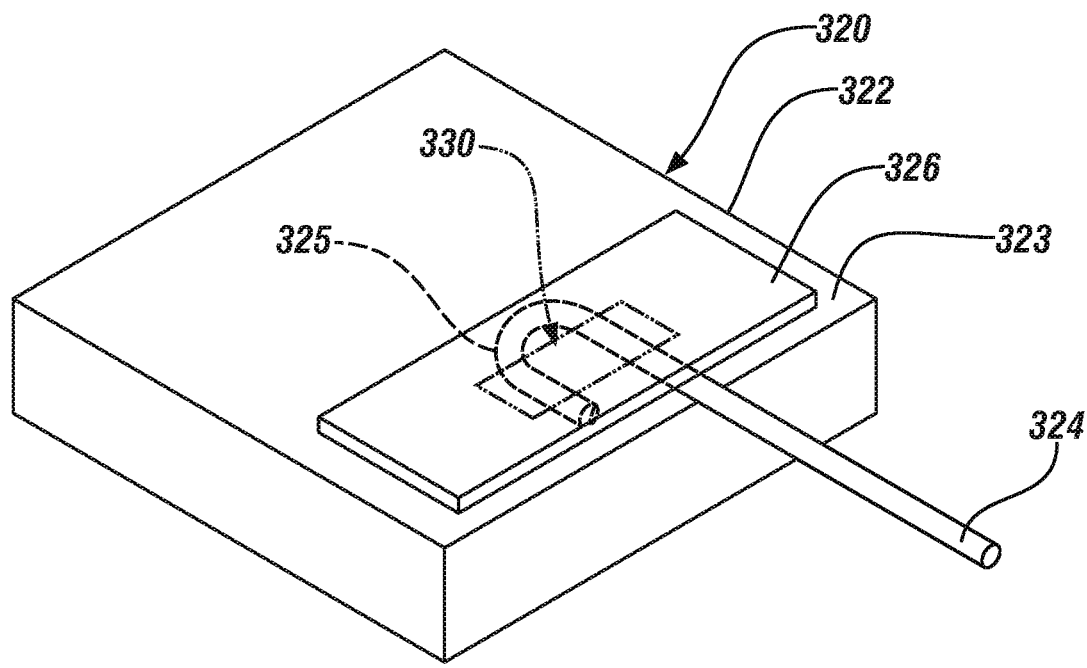
FIG. 4 is a schematic isometric illustration of an embodiment of a workpiece that includes a portion of the cable joined to the substrate in a lap arrangement with the cover piece positioned overtop, wherein the portion of the cable is formed into the shape of a hook prior to vibration welding of the cable to the substrate, in accordance with the disclosure.

FIG. 4 is a schematic isometric illustration of another embodiment of a workpiece 320 that includes a portion of a cable 324 that is to be joined to a surface 323 of a substrate 322 employing an embodiment of the vibration welding system 10 described with reference to FIG. 1. The workpiece 320 includes the portion of the cable 324 joined to the substrate 322 in a lap arrangement with a cover piece 326 overtop, wherein the portion of the cable 324 is formed into the shape of a hook 325 prior to vibration welding. The cover piece 326 is positioned to interpose between the portion of the cable 324 and the welding horn 14 of the vibration welding system 10. An example location of the vibration welding is indicated by element 330.

Figure 5:
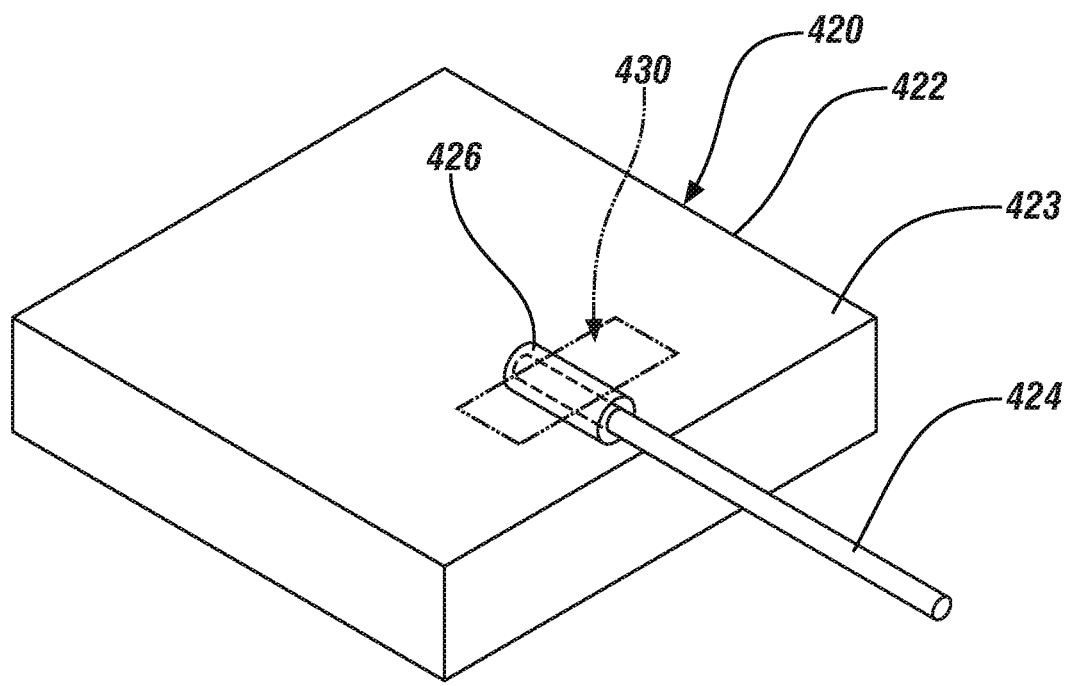
FIG. 5 is a schematic isometric illustration of an embodiment of a workpiece that includes a portion of the cable joined to the substrate in a lap arrangement with the cover piece, wherein the cover piece is a cylindrically-shaped tubular sheath and the portion of the cable is disposed therein prior to vibration welding, in accordance with the disclosure.

FIG. 5 is a schematic isometric illustration of another embodiment of a workpiece 420 that includes a portion of a cable 424 that is to be joined to a surface 423 of a substrate 422 employing an embodiment of the vibration welding system 10 described with reference to FIG. 1. The workpiece 420 includes the portion of the cable 424 joined to the substrate 422 in a lap arrangement with a cover piece 426, wherein the cover piece 426 is a cylindrically-shaped tubular sheath having a hollow center portion, and the portion of the cable 424 is disposed within the hollow center portion prior to vibration welding. The cover piece 426 is positioned to interpose between the portion of the cable 424 and the welding horn 14 of the vibration welding system 10. An example location of the vibration welding is indicated by element 430.

Figure 6:
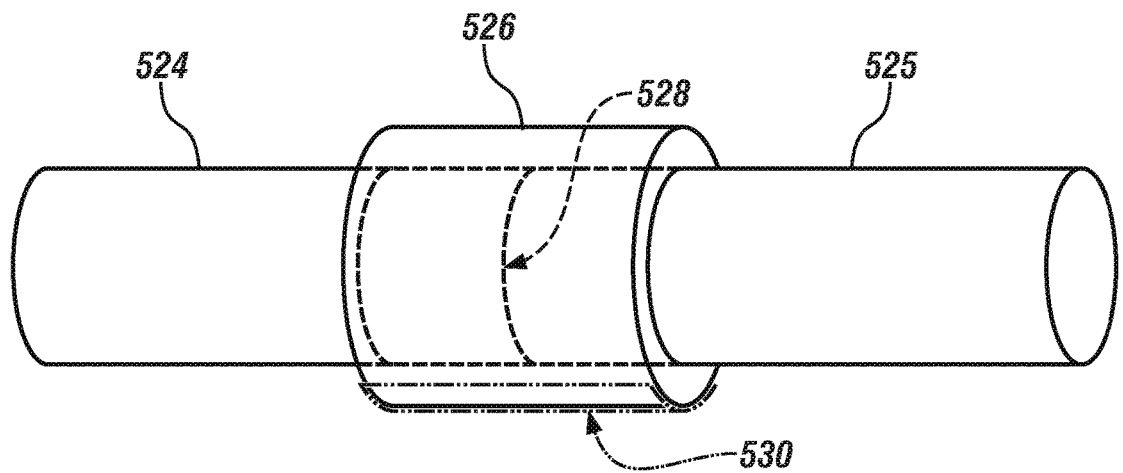
FIG. 6 is a schematic isometric illustration of an embodiment of a workpiece that includes the end portion of a first cable joined to an end portion of second cable in a butt arrangement, including a cover piece in the form of a tubular sheath, and wherein the end portions of the first and second cables are inserted into the cover piece, in accordance with the disclosure.

FIG. 6 is a schematic isometric illustration of another embodiment of a workpiece 520 that may be joined employing an embodiment of the vibration welding system 10 described with reference to FIG. 1. The workpiece 520 includes an end portion of a first cable 524 joined to an end portion of second cable 525 in a butt arrangement 528 employing a cover piece 526. In one embodiment, the cover piece 526 is a cylindrically-shaped tubular sheath, and end portions of the first and second cable 524, 525 are inserted into opposite ends of the cover piece 526. The cover piece 526 is positioned to interpose between the end portions of the cable 524, 525 and the welding horn 14 of the vibration welding system 10. An example location of the vibration welding is indicated by element 530.

Figure 7:
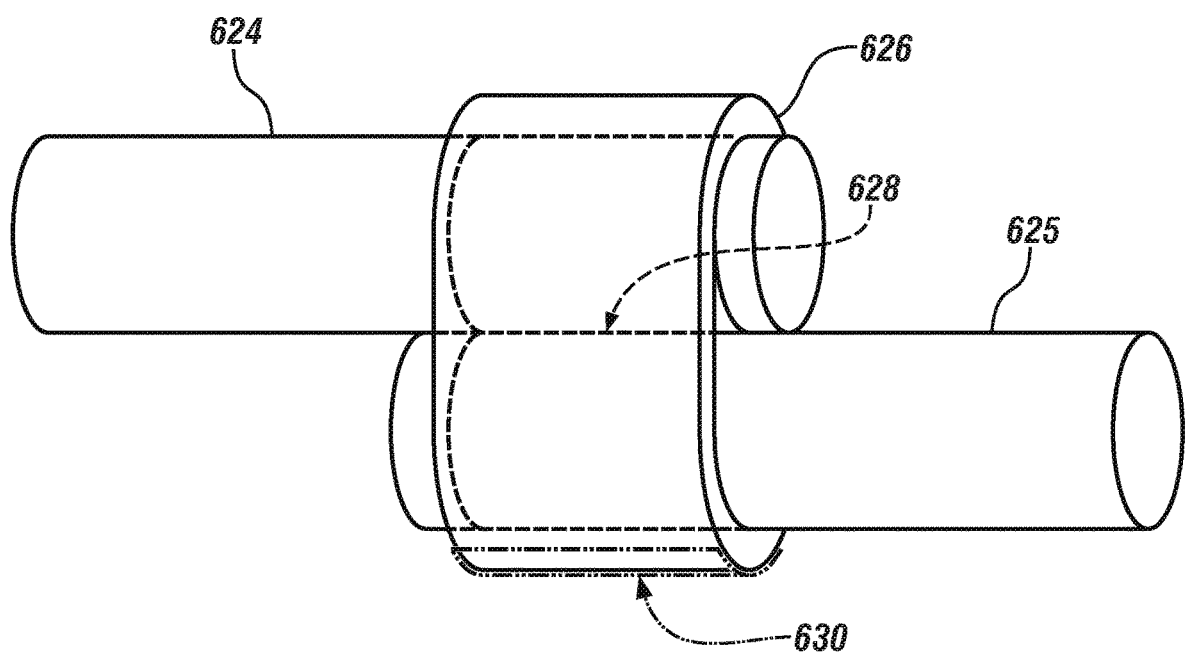
FIG. 7 is a schematic isometric illustration of an embodiment of a workpiece that includes the end portion of a first cable joined to an end portion of a second cable in a lap arrangement with the cover piece, wherein the cover piece is a cylindrically-shaped tubular sheath, and wherein the end portions of the first and second cables are inserted into the cover piece, in accordance with the disclosure.

FIG. 7 is a schematic isometric illustration of another embodiment of a workpiece 620 that may be joined employing an embodiment of the vibration welding system 10 described with reference to FIG. 1. The workpiece 620 includes the end portion of a first cable 624 joined to an end portion of a second cable 625 in a lap arrangement 628 employing a cover piece 626. In one embodiment, the end portions of the first and second cables 624, 625 are on two different cables. Alternatively, the end portions of the first and second cables 624, 625 are first and second ends of the same cable, thus forming a continuous loop of the cable. In one embodiment, the cover piece 626 is a cylindrically-shaped tubular sheath, and the end portions of the first and second cables 624, 625 are inserted into opposite ends of the cover piece 626. Alternatively, the cover piece 626 may be in the form of a thin, flexible foil element that is wrapped multiple times around the end portions of the first and second cables 624, 625. The cover piece 626 is positioned to interpose between the end portions of the cables 624, 625 and the welding horn 14 of the vibration welding system 10. An example location of the vibration welding is indicated by element 630.

The welding process and resultant weld joints described herein advantageously provide high quality joining of high modulus cables and SMA cables to substrates and to other wire cables employing vibration welding techniques, which facilitate low-heat welding to preserve SMA properties. Furthermore, such welding configurations may prevent notch formation in the cable that may be caused by knurl patterns employed on welding tip. As such, service life of the welds may be prolonged, along with increased welding tool life. This also serves to reduce required packaging space and thus increases opportunity of implementation of SMA sensors or actuators.

While the best modes for carrying out the invention have been described in detail, those familiar with the art to which this invention relates will recognize various alternative designs and embodiments for practicing the invention within the scope of the appended claims.

The invention claimed is:

1. A method for joining a shape-memory alloy (SMA) cable to a substrate employing a vibration welding system, the method comprising:
   positioning a portion of the SMA cable onto a surface of the substrate;
   interposing an aluminum cover piece overtop of the portion of the SMA cable;
   placing the substrate, the portion of the SMA cable and the cover piece onto an anvil of the vibration welding system such that the cover piece is interposed between the SMA cable and a sonotrode of the vibration welding system; and
   applying, via the sonotrode of the vibration welding system, vibration energy onto the cover piece, the portion of the SMA cable and the substrate;
   wherein applying the vibration energy mechanically joins the substrate, the SMA cable and the cover piece.

2. The method of claim 1, further comprising:
   forming a channel on the surface of the substrate; and
   positioning the portion of the SMA cable in the channel formed on the surface of the substrate.

3. A method for mechanically joining a cable to a substrate employing a vibration welding system, wherein the vibration welding system includes an anvil and a sonotrode, the method comprising:
   positioning a portion of the cable onto a surface of the substrate; interposing a cover piece overtop of the portion of the cable; placing the substrate, the portion of the cable and the cover piece onto the anvil of the vibration welding system such that the cover piece is interposed between the cable and the sonotrode of the vibration welding system
   wherein the cable comprises a single strand formed from a shape-memory alloy; and
   applying, via the sonotrode of the vibration welding system, vibration energy onto the cover piece, the portion of the cable and the substrate; wherein applying the vibration energy mechanically joins the substrate, the cable and the cover piece.

4. The method of claim 3, further comprising forming a hook portion on an end portion of the cable;

wherein positioning the portion of the cable onto the surface of the substrate comprises positioning the hook portion on the end portion of the cable onto the surface of the substrate.

5. The method of claim 4, further comprising inducing, via the sonotrode of the vibration welding system, a compressive force on the substrate, the portion of the cable and the cover piece placed on the anvil prior to applying, via the sonotrode of the vibration welding system, the vibration energy.

6. The method of claim 3, further comprising forming a channel onto the surface of the substrate, and
wherein positioning the portion of the cable onto the surface of the substrate comprises positioning the portion of the cable onto the channel formed onto the surface of the substrate.

7. The method of claim 6, further comprising inducing, via the sonotrode of the vibration welding system, a compressive force on the substrate, the portion of the cable and the cover piece placed on the anvil prior to applying, via the sonotrode of the vibration welding system, the vibration energy.

8. The method of claim 3, wherein the cover piece comprises a tubular sheath having a hollow portion, wherein interposing the cover piece overtop of the portion of the cable comprises inserting the cover piece into the hollow portion of the tubular sheath.

9. The method of claim 3, further comprising inducing, via the sonotrode of the vibration welding system, a compressive force on the substrate, the portion of the cable and the cover piece placed on the anvil prior to applying, via the sonotrode of the vibration welding system, the vibration energy.

10. The method of claim 3, further comprising:
wherein the cover piece comprises a device having a thickness that is selected to prevent mechanical damage to the cable during the applying of the vibration energy via the sonotrode of the vibration welding system.

11. The method of claim 3, wherein the substrate and the cover piece are fabricated from aluminum.

12. The method of claim 3, wherein the substrate and the cover piece are fabricated from copper.

13. The method of claim 3, wherein the substrate and the cover piece are fabricated from a thermoplastic polymer.

14. A method for mechanically joining a cable to a substrate, the method comprising:
positioning a portion of the cable onto a surface of the substrate;
wherein the cable comprises multiple strands, wherein each strand is formed from a shape-memory alloy;
interposing a cover piece overtop of the portion of the cable; placing the substrate, the portion of the cable and the cover piece onto an anvil of a vibration welding system such that the cover piece is interposed between the cable and a sonotrode of the vibration welding system;
inducing, via the sonotrode of the vibration welding system, a compressive force on the substrate, the portion of the cable and the cover piece placed on the anvil; and
applying, via the sonotrode of the vibration welding system, vibration energy onto the cover piece, the portion of the cable and the substrate;
wherein applying the vibration energy mechanically joins the substrate, the cable and the cover piece.

15. The method of claim 14, further comprising forming a hook portion on an end portion of the cable;
wherein positioning the portion of the cable onto the surface of the substrate comprises positioning the hook portion on the end portion of the cable onto the surface of the substrate.

16. The method of claim 14, further comprising forming a channel onto the surface of the substrate;
wherein positioning the portion of the cable onto the surface of the substrate comprises positioning the portion of the cable onto the channel formed onto the surface of the substrate.

17. The method of claim 14, wherein the cover piece comprises a device having a thickness that is selected to prevent mechanical damage to the cable during the applying of the vibration energy via the sonotrode of the vibration welding system.

* * * * *